United States Patent
Lin et al.

(10) Patent No.: US 10,981,248 B2
(45) Date of Patent: Apr. 20, 2021

(54) HYBRID WELDING APPARATUSES, SYSTEMS AND METHODS FOR SPATIALLY OFFSET COMPONENTS

(71) Applicant: General Electric Company, Schenectady, NY (US)

(72) Inventors: Dechao Lin, Greer, SC (US); Srikanth Chandrudu Kottilingam, Simpsonville, SC (US); Yan Cui, Greer, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 14/087,332

(22) Filed: Nov. 22, 2013

(65) Prior Publication Data

US 2015/0144605 A1 May 28, 2015

(51) Int. Cl.
  *B23K 26/348* (2014.01)
(52) U.S. Cl.
  CPC .................. *B23K 26/348* (2015.10)
(58) Field of Classification Search
  CPC ..... B23K 28/02; B23K 26/02; B23K 26/1429
  USPC ......................................... 219/121.6, 121.64
  See application file for complete search history.

(56) References Cited

U.S. PATENT DOCUMENTS

| | | | |
|---|---|---|---|
| 4,689,466 A | 8/1987 | Hoshinouchi et al. | |
| 5,006,688 A | 4/1991 | Cross | |
| 5,700,989 A | 12/1997 | Dykhno et al. | |
| 7,107,118 B2 | 9/2006 | Orozco et al. | |
| 8,546,720 B2 | 10/2013 | Lin et al. | |
| 2002/0008094 A1 | 1/2002 | Briand et al. | |
| 2005/0011868 A1 | 1/2005 | Matile et al. | |
| 2005/0263500 A1* | 12/2005 | Briand | B23K 26/348 219/121.64 |
| 2007/0007254 A1* | 1/2007 | Wang et al. | 219/91.22 |
| 2007/0017906 A1 | 1/2007 | Nowak et al. | |
| 2007/0251927 A1* | 11/2007 | Miessbacher | B23K 35/28 219/121.63 |
| 2008/0245774 A1* | 10/2008 | Kim et al. | 219/74 |
| 2010/0078412 A1 | 4/2010 | Diez et al. | |
| 2010/0236067 A1 | 9/2010 | Hu et al. | |

(Continued)

FOREIGN PATENT DOCUMENTS

| | | |
|---|---|---|
| CN | 101282814 A | 10/2008 |
| WO | 2006133034 A1 | 12/2006 |
| WO | 2012139211 A1 | 10/2012 |

OTHER PUBLICATIONS

Steven G. Shi, Paul Hilton, Steve Mulligan and Geert Verhaeghe, "Hybrid Nd: YAG laser-mag welding of thick section steel with adaptive control". TWI (http://www.twi.co.uk/content/spsgsoct2004.html), p. 1-23, Oct. 2004, Cambridge UK.

(Continued)

*Primary Examiner* — Erin E McGrath
(74) *Attorney, Agent, or Firm* — James Pemrick; Hoffman Warnick LLC

(57) ABSTRACT

Hybrid welding methods include directing a laser beam from a laser onto a first component that is vertically offset from a second component, and, directing a weld arc from an arc welder onto a weld joint between the first component and the second component to weld the first and second components together.

15 Claims, 2 Drawing Sheets

(56) References Cited

U.S. PATENT DOCUMENTS

| | | | |
|---|---|---|---|
| 2010/0276402 A1 | 11/2010 | Richard et al. | |
| 2011/0155711 A1 | 6/2011 | Doyle et al. | |
| 2011/0198317 A1 | 8/2011 | Lin | |
| 2011/0297658 A1* | 12/2011 | Peters | B23K 9/04 219/162 |
| 2012/0000892 A1* | 1/2012 | Nowak | B23K 26/26 219/121.64 |
| 2012/0261389 A1* | 10/2012 | Lin | B23K 26/348 219/121.46 |
| 2012/0273466 A1* | 11/2012 | Peters | B23K 26/348 219/73 |

OTHER PUBLICATIONS

"Lecture 3.3: Principles of Welding", ESDEP Lecture Note [WG3] (http://www.haiyangshiyou.com/esdep/master/wg03/t0300.htm), Nov. 22, 2010.

Moriaki Ono, Yukio Shinbo, Akihide Yoshitake and Masanori Ohmura, "Development of Laser-arc Hybrid Welding", NKK Techinical Review (http://www.lac-online.nl/dfl/f/development_of_hybrid_welding.pdf), No. 86,p. 8-12 (2002).

"Lecture 3.4: Welding Processes", ESDEP Lecture Note [WG3] (http://www.haiyanshiyou.com/esdep/master/wg03/toc.htm), Nov. 22, 2010.

"Laser Welding Review", Engineers Edge Solutions by Design (http://www.engineersedge.com/manufacturing/laser_welding.htm), Jan. 2011.

J.W. Elmer, "Characterization of Defocused Electron Beams and Welds in Stainless Steel and Refractory Metals using the Enhanced Modified Faraday Cup Diagnostic", Lawrence Livermore National Laboratory, p. 1-9, Jan. 23, 2009.

"Fiber laser", Wikipedia (http://en.wikipedia.org/wiki/Fiber_laser), Mar. 29, 2006.

"Disk laser", Wikipedia (http://en.wikipedia.org/wiki/Disk_laser), Jan. 25, 2007.

Nd: YAG laser, Wikipedia (http://en.wikipedia.org/wiki/Nd:YAG_laser), Feb. 26, 2004.

Carbon dioxide laser, Wikipedia (http://en.wikipedia.org/wiki/Carbon_dioxide_laser), Nov. 17, 2008.

Combined Search and Examination Report issued in connection with corresponding GB Application No. GB1419759.4 dated Jun. 8, 2015.

Search Report and Opinion issued in connection with corresponding CN Application No. 2014106777822 dated Jun. 15, 2017, 1 page.

Chinese Office Action for related Chinese application No. 201410677782.2 dated Jun. 23, 2017, 16 pages.

Chinese Office Action for related Chinese application No. 201410677782.2 dated Apr. 3, 2018, 7 pages.

Chinese Office Action for related Chinese application No. 201410677782.2 dated Nov. 7, 2018, 15 pages.

Chinese Office Action for related Chinese application No. 201410677782.2 dated Mar. 29, 2019, 13 pages.

* cited by examiner

HYBRID WELDING APPARATUSES, SYSTEMS AND METHODS FOR SPATIALLY OFFSET COMPONENTS

BACKGROUND OF THE INVENTION

The subject matter disclosed herein relates to welding and, more specifically, to hybrid welding for spatially offset components.

Welding can be utilized for a variety of manufacturing or repair processes in multiple different industrial settings. For example, welding can be utilized to join multiple components, repair cracks, gaps or defects in used components, build up material in used or new components, or otherwise weld or join one or more components as needed for a particular application. However, the ability or speed that welding can occur can be limited by a number of factors including the thickness and alignment of the components being welded and the power of the welding apparatus.

Hybrid welding can combine the utilization of both laser welding and arc welding to potentially weld at a faster rate while still achieving full penetration. However, as components become thicker, an increase in laser power may still be required for full penetration. The configuration of the laser welder and the arc welder may thereby be adjusted to influence the weld result. For example, hybrid welding can include using a leading laser welder followed by a forehand arc welder to provide relatively smooth welds. However, such configurations may also be limited in the relative orientation of the substrate component(s). For example, components that are vertically offset by more than about 0.04 inches may require additional accommodations to ensure full penetration welds for both components. However, these additional accommodations may also depend on adaptive weld controls that vary weld parameters during operation to provide consistent results.

Accordingly, alternative hybrid welding apparatuses, systems and methods would be welcome in the art.

BRIEF DESCRIPTION OF THE INVENTION

In one embodiment, a hybrid welding method is disclosed. The hybrid welding method includes directing a laser beam from a laser onto a first component that is vertically offset from a second component, and, directing a weld arc from an arc welder onto a weld joint between the first component and the second component to weld the first and second components together.

In another embodiment, a hybrid welding apparatus is disclosed. The hybrid welding apparatus includes a laser that produces a laser beam directed onto a first component vertically offset from a second component, and, an arc welder that produces a weld arc directed onto a weld joint between the first component and the second component.

In yet another embodiment, a hybrid welding system is disclosed. The hybrid welding system includes a hybrid welding apparatus comprising a laser that produces a laser beam and an arc welder that produces weld arc. The hybrid welding system further includes a first component vertically offset from a second component, wherein the laser beam is directed onto the first component and the weld arc is directed onto a weld joint between the first and second component.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A hybrid welding system for spatially offset components as disclosed herein generally comprises a hybrid welding apparatus and two spatially offset components having a weld joint there between. The hybrid welding apparatus generally comprises a laser and an arc welder. The laser directs a laser beam onto a first component that is at least vertically offset from the second component. The arc welder directs a weld arc towards the weld joint between the first component and the second component. Directing the laser onto the first component, as opposed to the weld joint itself, may provide a full penetration weld between to spatially offset components with less initial joint preparation and/or without the need for adaptive control. Hybrid welding apparatuses, systems and methods for spatially offset components will now be described in more detail herein.

Figure 1:
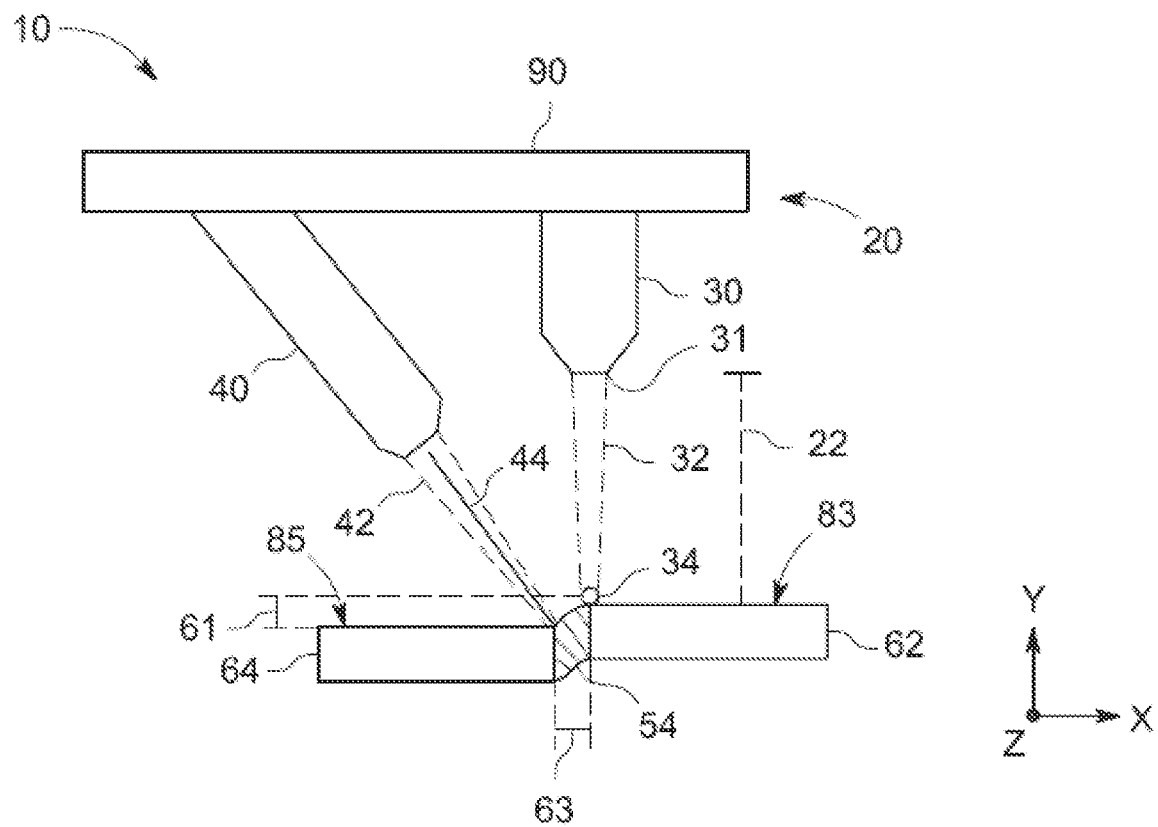
FIG. 1 is a perspective view of a schematic representation of a hybrid welding system according to one or more embodiments shown or described herein.

Referring now to FIG. 1, a hybrid welding system 10 comprising a hybrid welding apparatus 20 and two spatially offset components 62 and 64 is schematically illustrated.

The first component 62 and the second component 64 may comprise any two materials that are to be welded together that are spatially offset. As used herein, "spatially offset" refers to being separated in a vertical direction y and/or a horizontal direction x (wherein the weld direction z is perpendicular to the plane comprising the vertical direction y and the horizontal direction x). The first and second components 62 and 64 can comprise two separate and distinct pieces (e.g., to pipes brought together) or may comprise two different areas on a single piece that are separated by a space to be welded (e.g., a crack in a pipe).

In some embodiments, the first component 62 may be vertically offset 61 from the second component 64. For example, the first component 62 may be vertically offset 61 from the second component 64 by at least about 0.02 inches. In some embodiments, the first component 62 may be vertically offset 61 from the second component 64 by at least about 0.05 inches. In even some embodiments, the first component 62 may be vertically offset 61 from the second component 64 by up to and including 0.125 inches.

The first and second components 62 and 64 may be vertically offset 61 for a variety of reasons. For example, the first and second components 62 and 64 may comprise pipes of different diameters abutted against one another, may comprise work pieces of different thickness such that the thicker component is vertically taller than the other, may comprise non-uniform edges that rise and fall in the vertical direction y as the weld joint 54 advances in the weld direction z, or may otherwise be aligned in a configuration that provides a vertical offset 61 as discussed herein.

In some embodiments, the first component 62 may additionally be horizontally offset 63 from the second component 64. For example, the first component 62 may be horizontally offset 63 from the second component 64 by at least about 0.01 inches. In some embodiments, the first component 62 may be horizontally offset 63 from the second component 64 by at least about 0.02 inches. In even some embodiments, the first component 62 may be horizontally offset 63 from the second component 64 by up to and including 0.045 inches.

Similar to the vertical offset 61, the horizontal offset 63 may be a result of a variety of reasons. For example, one or both of the components 62 and 64 may have non-uniform edges that deviate in the horizontal direction x as the weld joint advances in the weld direction z or may otherwise be aligned in a configuration that provides a horizontal offset 63 as discussed herein.

The spatial offset (i.e., the vertical offset 61 and potentially the horizontal offset 63) between the first component 62 and the second component 64 may be present for the entire length of the weld joint 54 or for one or more portions of the weld joint 54. For example, when the first component 62 and second component 64 comprise relatively uniform edges (such as cleanly cut pipes of different diameters being brought together), the at least vertical offset 61 may be present, and potentially relatively uniform, for about the entire length of the weld joint 54. Alternatively, where the first component 62 and/or the second component 64 comprise non uniform edges, or are aligned at slight angles, the vertical offset 61 and potential horizontal offset 63 may vary along the length of the weld joint 54 in the weld direction z. For example, the vertical offset 61 may increase and decrease with respect to the location along the weld direction z and may even exist for only portions thereof.

The components 62 and 64 to be welded can be selected from materials such as ferrous and non-ferrous materials. Examples of ferrous and non-ferrous materials include, but are not limited to, superalloys, mild steel, high-strength steel, stainless steel, titanium, aluminum, and combinations thereof.

Referring still to FIG. 1, in addition to the first and second components 62 and 64, the hybrid welding system 10 further comprises a hybrid welding apparatus 20. The hybrid welding apparatus 20 itself comprises a laser 30 and an arc welder 40.

The laser 30 can comprise any laser system that can produce and direct a laser beam 32 towards one of the components 62 and 64. For example, in some embodiments, the laser 30 is selected from a Nd: YAG laser, a $CO_2$ laser, a fiber laser, or a disk laser. In some embodiments, the laser 30 is a high-density powered laser.

The laser 30 produces a laser beam 32. The laser beam 32 is directed towards either the first component 62 or the second component 64. Specifically, the laser beam 32 can be directed towards either the higher offset component 62 (as illustrated) or lower offset component 64. Moreover, the laser beam 32 may be directed at a variety of angles relative to the weld joint 54 such as an angle of 0 degrees (i.e., perpendicular to the weld joint 54 as illustrated) or from about plus 30 degrees to about minus 30 degrees relative the 0 degree reference. By providing a laser beam 32 on just one of the vertically offset components 62 and 64 (as opposed to the weld joint 54 itself), the laser beam 32 can promote full penetration of the weld joint 54 without requiring adaptive control as the weld progresses in the weld direction z.

The laser head 31 of the laser 30 may be separated from one of the top surfaces 83 and 85 of the first and second components 62 and 64 by a height 22. In some embodiments, the height 22 may be based on the operational requirements of the laser head 31. In some embodiments, the height 22 between the laser head 31 and one of the top surfaces 83 and 85 of the first and second components 62 and 64 remains fixed as the weld progresses in the weld direction z. In other embodiments, the height 22 between the laser head 31 and one of the top surfaces 83 and 85 of the first and second components 62 and 64 varies as the weld progresses in the weld direction z (such as due to a moving laser head and/or an uneven surface 83 or 85).

In some embodiments, such as that illustrated in FIG. 1, the laser beam 32 has a focus point 34 that is focused on one of the surfaces 83 and 85 of the components 62 and 64. In such embodiments, the focus distance (i.e., the length of the laser beam 32 between the laser head 31 and the focus point 34) is the same as the height 22 between the laser head 31 and one of the top surfaces 83 and 85 of the components 62 and 64. Such embodiments may provide the greatest laser power to the relevant component 62 and 64 by focusing all or most of the laser energy on a smaller surface area and providing greater penetration ability. Specifically, such embodiments may utilize a laser 30 of relatively lower power (e.g., less than or equal to about 4 kW such as for welding components having a thickness of up to about 6.35 mm) by focusing all or most of its energy at one of the surfaces 83 and 85 as opposed to distributing it to a wider area. For thicker components, a higher laser power may be needed, such as, for example, up to or exceeding 20-kW.

Referring still to FIG. 1, the hybrid welding apparatus 20 further comprises the arc welder 40 in addition to the laser 30. In one embodiment, the arc welder 40 is selected from welders including consumable electrodes 44, such as, but not limited to, a gas metal arc welder (GMAW) (e.g. a metal inert gas (MIG) welder), a flux cored arc welder (FCAW) and welders having non-consumable electrodes with wire feeding, such as, but not limited to, a gas tungsten arc welder (GTAW) with wire feeding and a plasma arc welder (PAW) with wire feeding.

The arc welder 40 produces a weld arc 42 that progresses in the weld direction z. In some embodiments, the laser beam 32 can be produced at the same time and directly adjacent to the weld arc 42 to increase the combination of energy from the two sources. In some embodiments, the laser beam 32 does not have any overlap with the weld joint 54. By reducing or eliminating the overlap, the weld joint 54 may have more uniform properties.

In some embodiments, the laser 30 and the arc welder 40 are mounted in separate places. In other embodiments, such as that illustrated in FIG. 1, the laser 30 and the arc welder 40 are mounted on a single mount 90. Furthermore, in some embodiments, the laser beam 32 may have a substantially constant weld power throughout the weld. For example, when the laser beam 32 doesn't overlap with the weld joint 54, the laser beam 32 may not need to be adaptively controlled to still produce consistent welds.

Figure 2:
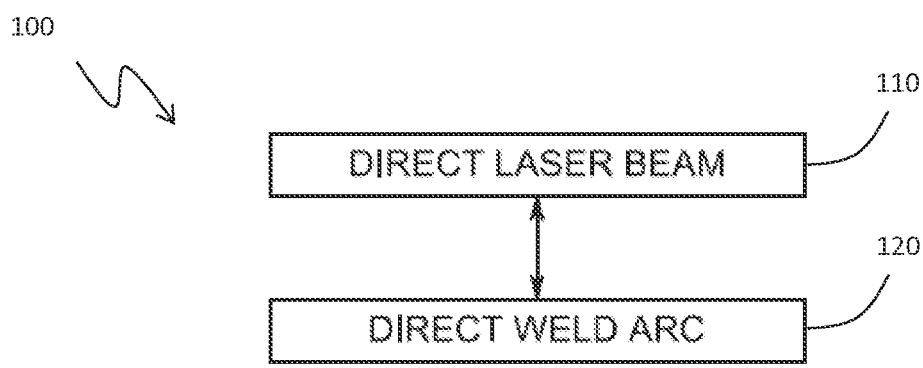
FIG. 2 is a hybrid welding method according to one or more embodiments shown or described herein; and, FIG. 3 is a cross-sectional view of a full penetration weld created by the hybrid welding system according to one or more embodiments shown or described herein.

Referring additionally to FIG. 2, a method 100 is illustrated for welding to spatially offset components 62 and 64. The method 100 comprises directing a laser beam 32 from a laser 30 onto a first component 62 that is vertically offset 61 from a second component 64 in step 110 as disclosed herein. The method 100 further comprises directing a weld arc 42 from an arc welder 40 onto a weld joint 54 between the first component 62 and the second component 64 to weld the first and second components 62 and 64 together in step 120 as also disclosed herein. It should be appreciated that steps 110 and 120 may start, stop and occur in unison or in any relative order to achieve a sufficient weld joint 54.

EXAMPLE

Two circular components were placed adjacent to each other in order to perform a weld a using hybrid welding system as disclosed herein. Each of the components comprised a 0.25 inches thick piece of stainless steel 304L, wherein the first component was vertically offset by about 0.125 inches and horizontally offset by about 0.045 inches.

Figure 3:
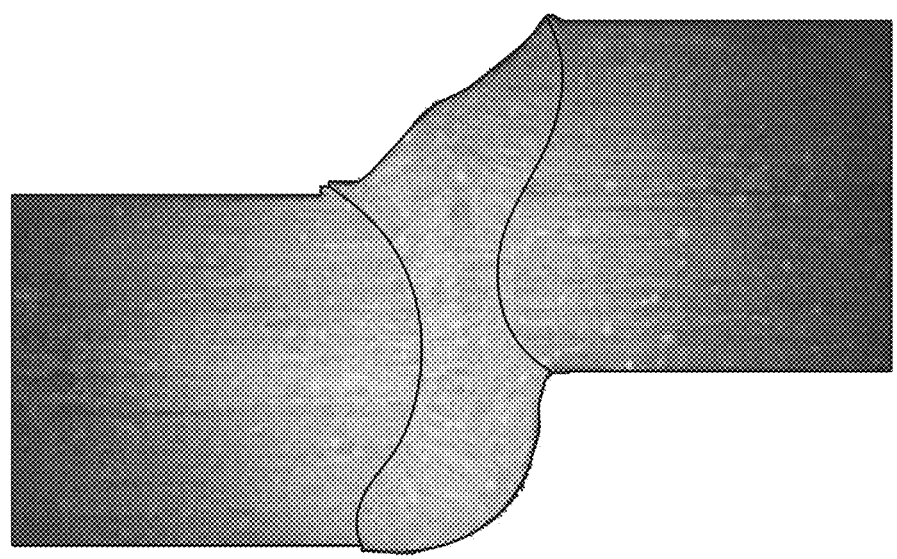

The laser produced a laser beam of 8-kW and the arc welder comprised a GMAW that produced a weld at wire feeding rate of 350 imp with voltage setting at 26.5 V. The laser beam and the weld arc progressed in the weld direction at a speed of 60 inches per minute (ipm). Microscopic analysis (presented in FIG. 3) verified a full penetration weld was achieved.

It should now be appreciated that directing a laser onto a first component, as opposed to a weld joint itself, may provide a full penetration weld between two spatially offset components with less initial joint preparation and/or without the need for adaptive control. Such hybrid welding apparatuses, systems and methods may thereby provide for the more efficient welding of spatially offset components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid welding method comprising:
   directing a laser beam from a laser onto a top surface of a first component, wherein the directing comprises directing the laser beam onto an edge of the top surface of the first component,
   wherein the first component is vertically and horizontally offset from a second component and is separated from the second component, and wherein along a vertical direction, a top surface of the second component is below the top surface of the first component and above a bottom surface of the first component, wherein a focus distance is a length of the beam between a laser head and a focus point of the laser beam, and wherein the focus distance is the same as a height between the laser head and the top surface of the first component; and
   directing a weld arc from an arc welder onto a weld joint between the first component and the second component to weld the first and second components together, wherein the directing of the weld arc includes moving the arc welder in a weld direction, the weld direction being perpendicular to a plane comprising the vertical direction and a horizontal direction,
   wherein the laser beam does not overlap with the weld joint, and wherein the laser beam promotes a full penetration weld when directing the laser beam with the focus point on the edge of the top surface of the first component.

2. The hybrid welding method of claim 1, wherein the laser beam only contacts the first component, and wherein the first component does not contact the second component on any surface prior to forming the weld joint.

3. The hybrid welding method of claim 1, wherein the top surface of the first component is vertically offset from the top surface of the second component by from 0.02 inches to 0.125 inches.

4. The hybrid welding method of claim 3, wherein adjacent sides of the first component and the second component are horizontally offset by from 0.02 inches to 0.045 inches.

5. The hybrid welding method of claim 1, wherein the laser has a power of less than or equal to 8 kw.

6. The hybrid welding method of claim 1, wherein the first component and the second component are two different areas of a single workpiece.

7. The hybrid welding method of claim 1, wherein the laser beam is produced at the same time as and directly adjacent to the weld arc.

8. The hybrid welding method of claim 1, wherein the weld joint is a butt joint.

9. A hybrid welding system comprising:
   a hybrid welding apparatus comprising a laser that produces a laser beam;
   an arc welder that produces weld arc; and
   a first component vertically and horizontally offset from a second component, wherein the first component is separated from the second component, wherein along a vertical direction, a top surface of the second component is below a top surface of the first component and above a bottom surface of the first component, wherein a focus distance is a length of the beam between a laser head and a focus point of the laser beam, and wherein the focus distance is the same as a height between the laser head and the top surface of the first component, wherein the laser beam is directed onto the top surface of the first component and the weld arc is directed onto a weld joint between the first component and the second component, wherein the directing of the weld arc includes moving the arc welder in a weld direction, the weld direction being perpendicular to a plane comprising the vertical direction and a horizontal direction,
wherein the laser beam does not overlap with the weld, and wherein the laser beam promotes a full penetration weld when directing the laser beam with the focus point on an edge of the top surface of the first component.

10. The hybrid welding system of claim 9, wherein the laser beam is positioned to only contact the first component, and wherein the first component does not contact the second component on any surface prior to forming the weld joint.

11. The hybrid welding system of claim 9, wherein the top surface of the first component is vertically offset from the top surface of the second component by from 0.02 inches to 0.125 inches.

12. The hybrid welding system of claim 11, wherein adjacent sides of the first component and the second component are horizontally offset from the second component by from 0.02 inches to 0.045 inches.

13. The hybrid welding system of claim 9, wherein the laser produces the laser beam at a constant power throughout a weld.

14. The hybrid welding system of claim 9, wherein the laser has a power of less than or equal to 8 kw.

15. The hybrid welding system of claim 9, wherein the weld joint is a butt joint.

\* \* \* \* \*